July 10, 1928.

W. COX ET AL 1,676,773

METHOD OF MAKING CORRUGATED WIRE GLASS

Filed July 16, 1927   2 Sheets-Sheet 1

WITNESS:
Robt R Kitchel.

INVENTORS
Walter Cox and
Arno Shuman
BY
Augustus B. Stoughton
ATTORNEY.

Patented July 10, 1928.

1,676,773

UNITED STATES PATENT OFFICE.

WALTER COX AND ARNO SHUMAN, OF PHILADELPHIA, PENNSYLVANIA, ASSIGNORS TO PENNSYLVANIA WIRE GLASS COMPANY, OF PHILADELPHIA, PENNSYLVANIA, A CORPORATION OF NEW JERSEY.

METHOD OF MAKING CORRUGATED WIRE GLASS.

Application filed July 16, 1927. Serial No. 206,215.

Objects of the present invention are to provide an increase in production and effect a saving in cost of manufacture while at the same time producing a product of good quality and appearance.

To these and other ends hereinafter set forth or appearing, the invention comprises continuously rolling a lengthwise corrugated sheet of glass, initiating the corrugation of a flat wire mesh by embedding and securing its end in the first formed corrugations of the sheet, permitting the flat portion of the wire mesh to continuously assume corrugated form above the corrugated sheet as the rolling progresses, embedding the wire mesh in corrugated form into the corrugated sheet as the rolling operation progresses, and pressing or patting the roughened surface of the sheet through which the wire has been pressed.

The invention also comprises the improvements to be presently described and finally claimed.

In the following description reference will be made to the accompanying drawings in which there is illustrated apparatus adapted for use in the practice of the invention and in the drawings Figure 1 is a diagrammatic view in side elevation and partly in section.

Figure 1:
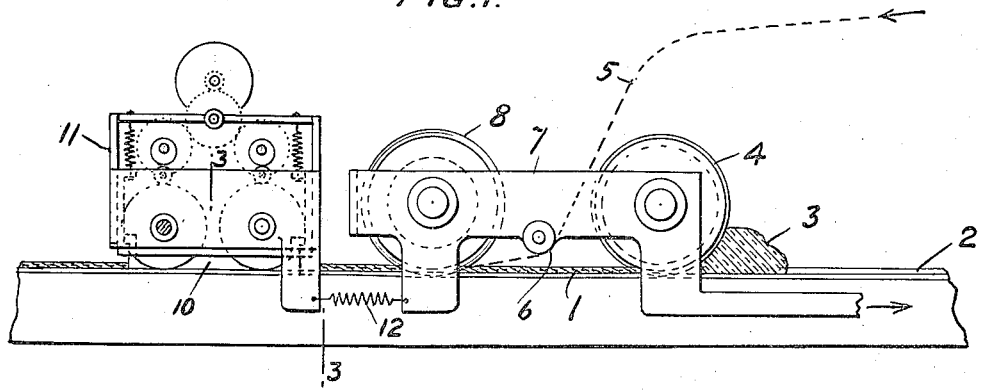
Figure 2:
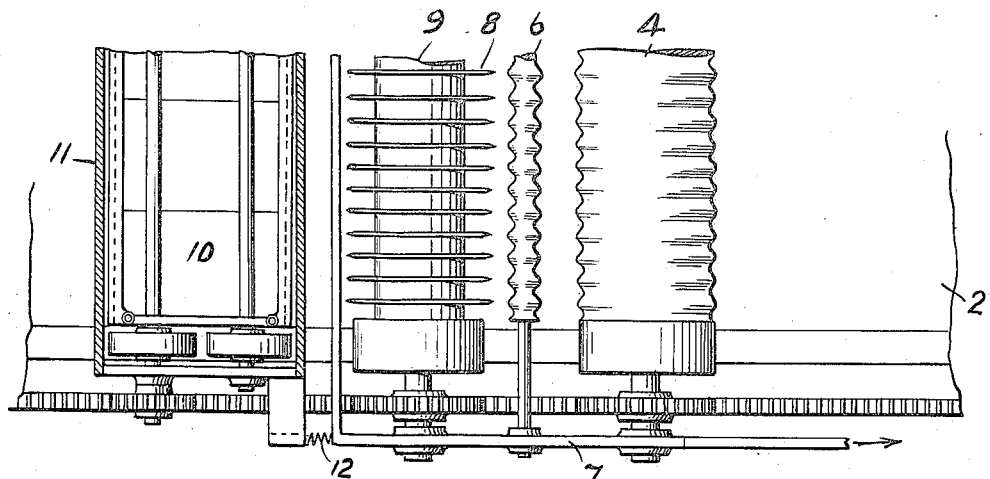
Fig. 2 is a top or plan view of a portion of the apparatus shown in Fig. 1 but omitting the glass and the corrugated table for the sake of clearness.
Figure 3:
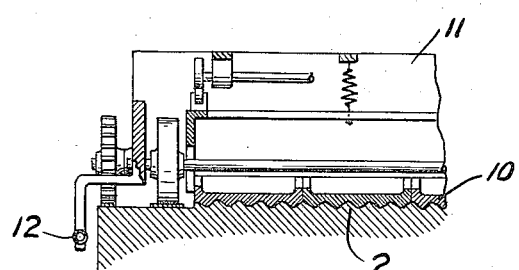
Fig. 3 is a sectional view taken on the line 3—3 of Fig. 1.

And endwise corrugated sheet of glass 1 is rolled on the endwise corrugated table 2 from a pour of glass 3 by means of a corrugated roller 4. The end of a flat sheet of wire mesh 5 is embedded in the first formed corrugations of the sheet and this initiates the corrugation of the flat wire mesh so that the wire mesh continually assumes corrugated form above the corrugated sheet as the rolling progresses. The roller 6 is merely a guide and may well be omitted. As the rolling progresses the carriage 7 moves toward the right and the ribs 8 of the roll 9 operating in the valleys of the corrugations of the wire mesh and glass push the mesh into the center of the glass, and the ribs in pairs pull the intervening portion of the mesh through the face of the glass into central position. This of course leaves the face of the glass roughened, and the roughened surface through which the mesh has passed is smoothed by pressing or patting. As shown this is done by means of a water cooled or other appropriate press 10 carried by a trailer 11 connected with the carriage 7 by a spring 12. On the trailer there is mechanism for raising and lowering the press. The carriage 7 progresses uniformly and the trailer 11 progresses intermittently. When the press 10 is operating on the glass, the trailer 11 stands still and the spring 12 is extended. When the press is released from the glass the spring draws the trailer forward into contact with the carriage.

Figure 4:
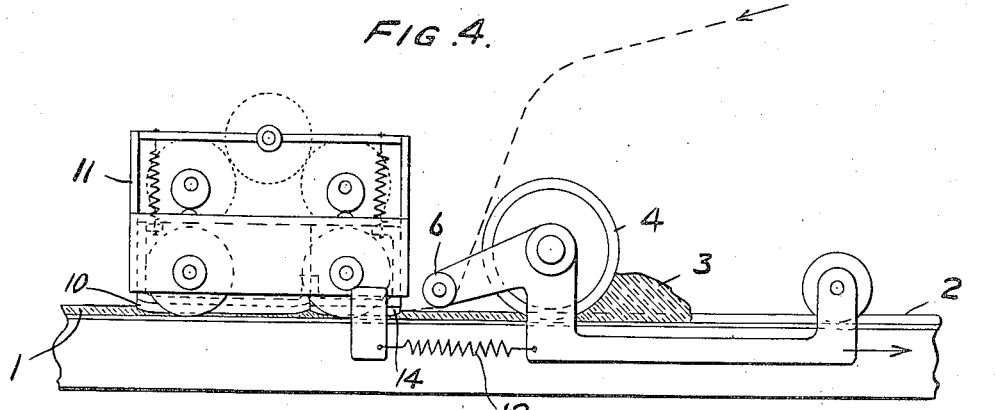
Fig. 4 is a view similar to Fig. 1 but illustrating a modification.
Figure 5:
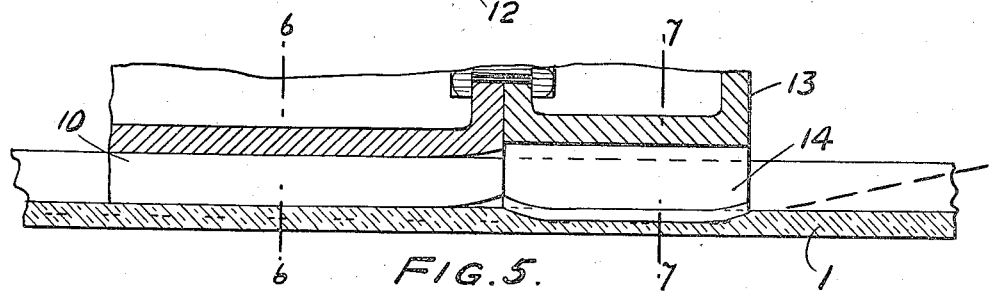
Fig. 5 is a view drawn to an enlarged scale and illustrating a longitudinal section through parts shown at the left in Fig. 4.
Figure 6:
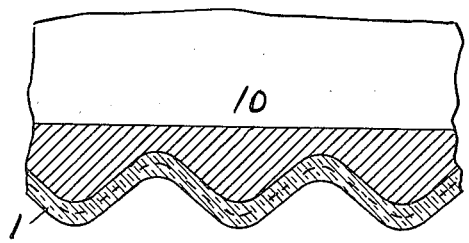
Fig. 6 is a sectional view taken on the line 6—6 of Fig. 5.
Figure 7:
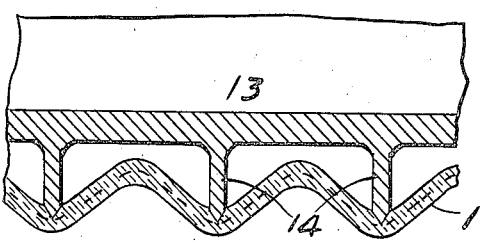
Fig. 7 is a sectional view taken on the line 7—7 of Fig. 5.
Figure 8:
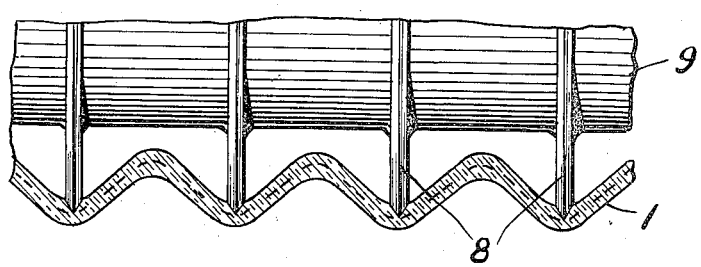
Fig. 8 is a view drawn to an enlarged scale of a part of the embedding roll shown in Figs. 1 and 2.

The practice of the process in connection with the apparatus shown in Figs. 4, 5, 6 and 7 is as above described except that the ribbed roller 9 is dispensed with and its function is performed by providing the platen 13 of the press, or more accurately the leading portion of it, with ribs 14 which perform the same function as the ribs 8 of the roller 9.

It will be obvious to those skilled in the art to which the invention relates that modifications may be made in details of procedure and in matters of mere form without departing from the spirit of the invention which is not limited to such matters or otherwise than the prior art and the appended claims may require.

We claim:

1. The method of making corrugated wire glass which comprises continuously rolling a lengthwise corrugated sheet of glass, initiating the corrugation of a flat wire mesh by securing its end in the first formed corrugations of the sheet, permitting the flat portion of the mesh to assume corrugated form above the corrugated sheet as the rolling progresses, embedding the corrugated wire mesh in corrugated form into the corrugated sheet, and pressing the roughened surface of the sheet through which the wire passed.

2. The method of making corrugated wire glass which comprises continuously rolling a lengthwise corrugated sheet of glass, initiating the corrugation of a flat wire mesh by securing its end in the first formed corrugations of the sheet, permitting the flat portion of the mesh to assume corrugated form above the corrugated sheet as the rolling progresses, embedding the valley portions of the corrugated wire mesh into the valley portions of the corrugated sheet thereby pulling the peak portions of the wire mesh into the peak portions of the sheet, and pressing the roughened surface of the sheet through which the wire passed.

WALTER COX.
ARNO SHUMAN.